United States Patent
Lv et al.

(10) Patent No.: US 9,981,217 B2
(45) Date of Patent: May 29, 2018

(54) AIR FILTRATION EQUIPMENT, SCREEN WINDOW AND WINDOW

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Zhenhua Lv, Beijing (CN); Rui Xu, Beijing (CN); Lei Wang, Beijing (CN); Shijun Wang, Beijing (CN); Xiaochuan Chen, Beijing (CN); Xuewen Lv, Beijing (CN); Wenbo Jiang, Beijing (CN); Wenjun Xiao, Beijing (CN); Yong Zhang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 91 days.

(21) Appl. No.: 15/168,737

(22) Filed: May 31, 2016

(65) Prior Publication Data

US 2017/0028336 A1    Feb. 2, 2017

(30) Foreign Application Priority Data

Jul. 30, 2015    (CN) .......................... 2015 1 0460024

(51) Int. Cl.
*B01D 46/44*    (2006.01)
*B01D 46/00*    (2006.01)
(Continued)

(52) U.S. Cl.
CPC ....... *B01D 46/442* (2013.01); *B01D 46/0005* (2013.01); *B01D 46/10* (2013.01);
(Continued)

(58) Field of Classification Search
CPC .... B01D 46/0016; B01D 46/18; B01D 46/22; B01D 29/09
(Continued)

(56) References Cited

U.S. PATENT DOCUMENTS

| 5,217,513 A * | 6/1993 | Armbruster ............ B01D 46/18 55/351 |
| 2009/0038480 A1 * | 2/2009 | Garman ............ B01D 46/0016 96/414 |

(Continued)

FOREIGN PATENT DOCUMENTS

| CN | 86202040 U | 6/1988 |
| CN | 103334667 A | 10/2013 |

(Continued)

OTHER PUBLICATIONS

Chinese Office Action dated Jul. 25, 2016.
Chinese Office Action dated Nov. 1, 2016.

*Primary Examiner* — Robert A Hopkins
*Assistant Examiner* — Minh-Chau Pham
(74) *Attorney, Agent, or Firm* — Dilworth & Barrese, LLP.; Michael J. Musella, Esq.

(57) ABSTRACT

An air filtration equipment, the air filtration equipment is installed in an ventilation area at an interface between indoor and outdoor spaces of a fixed space, the equipment including: a sensor configured to sense information on inhalable particles in outside air; at least one filtering layer configured to filter out inhalable particles in air entering from the ventilation area into the indoor space; and a control device connected with the sensor and the at least one filtering layer (Continued)

and configured to control the at least one filtering layer to expand according to the information sensed by the sensor, such that the expanded at least one filtering layer covers the ventilation area. Also, a screen window and a window are provided.

20 Claims, 3 Drawing Sheets

(51) Int. Cl.
*B01D 46/10* (2006.01)
*F24F 13/28* (2006.01)
*B01D 46/18* (2006.01)

(52) U.S. Cl.
CPC ........... *B01D 46/103* (2013.01); *B01D 46/18* (2013.01); *F24F 11/30* (2018.01); *F24F 13/28* (2013.01); *B01D 2273/10* (2013.01); *F24F 2110/50* (2018.01); *F24F 2110/52* (2018.01); *F24F 2221/20* (2013.01); *Y02B 30/78* (2013.01)

(58) Field of Classification Search
USPC ... 55/352, 354, 486, 527, DIG. 24, DIG. 42; 96/222, 414
See application file for complete search history.

(56) References Cited

U.S. PATENT DOCUMENTS

| | | | | |
|---|---|---|---|---|
| 2012/0317938 | A1* | 12/2012 | Sullivan | ................. B01D 46/18 55/354 |
| 2014/0373719 | A1* | 12/2014 | Spiegel | .................. B01D 46/22 96/222 |
| 2015/0373875 | A1* | 12/2015 | Kira | ................... H05K 7/20181 96/407 |

FOREIGN PATENT DOCUMENTS

| | | |
|---|---|---|
| CN | 203499537 U | 3/2014 |
| CN | 203515268 U | 4/2014 |
| CN | 204899741 U | 12/2015 |
| KR | 20100025054 A | 3/2010 |

* cited by examiner

AIR FILTRATION EQUIPMENT, SCREEN WINDOW AND WINDOW

TECHNICAL FIELD

The present disclosure relates to an air filtration equipment, a screen window and a window.

BACKGROUND

With the rapid development of industry, air is deteriorating more and more and people concern air quality grades such as PM2.5 more and more. In order to avoid inhaling polluted air as much as possible, many users have installed air purifiers at homes. However, the drawback with an air purifier is that the air purifier can not purify indoor air in a short time, and therefore the householders are inhaling non-purified air continuously as well while purifying the air. In addition, using an air purifier while windows are closed for a long time makes indoor air incapable of circulating with outdoor air, leading to increase of concentration of indoor carbon dioxide, which can not guarantee people's health too.

SUMMARY

According to an aspect of this disclosure, an air filtration equipment that may be installed in an ventilation area at an interface between indoor and outdoor spaces of a fixed space, the equipment comprising: a sensor configured to sense information on inhalable particles in outside air; at least one filtering layer configured to filter out inhalable particles in air entering from the ventilation area into the indoor space; and a control device connected with the sensor and the at least one filtering layer and configured to control the at least one filtering layer to expand according to the information sensed by the sensor, such that the expanded at least one filtering layer covers the ventilation area.

According to another aspect of this disclosure, a screen window comprising a screen window support and an air filtration equipment installed on the screen window support; the air filtration equipment capable of being installed in an ventilation area at an interface between indoor and outdoor spaces of a fixed space, the equipment comprising: a sensor configured to sense information on inhalable particles in outside air; at least one filtering layer configured to filter out inhalable particles in air entering from the ventilation area into the indoor space; and a control device connected with the sensor and the at least one filtering layer and configured to control the at least one filtering layer to expand according to the information sensed by the sensor, such that the expanded at least one filtering layer covers the ventilation area.

According to another aspect of this disclosure, a window comprising a window support and an air filtration equipment installed on the window support; the air filtration equipment capable of being installed in an ventilation area at an interface between indoor and outdoor spaces of a fixed space, the equipment comprising: a sensor configured to sense information on inhalable particles in outside air; at least one filtering layer configured to filter out inhalable particles in air entering from the ventilation area into the indoor space; and a control device connected with the sensor and the at least one filtering layer and configured to control the at least one filtering layer to expand according to the information sensed by the sensor, such that the expanded at least one filtering layer covers the ventilation area.

BRIEF DESCRIPTION OF DRAWINGS

The present disclosure will become more fully understood from the detailed description given hereinafter and the accompanying drawings used when describing the embodiments, which are given by way of illustration only, and thus are not limitative of the present disclosure. Those skilled in the art can obtain other drawings according to the drawings illustrated herein without inventive labors. Wherein.

Figure 1:
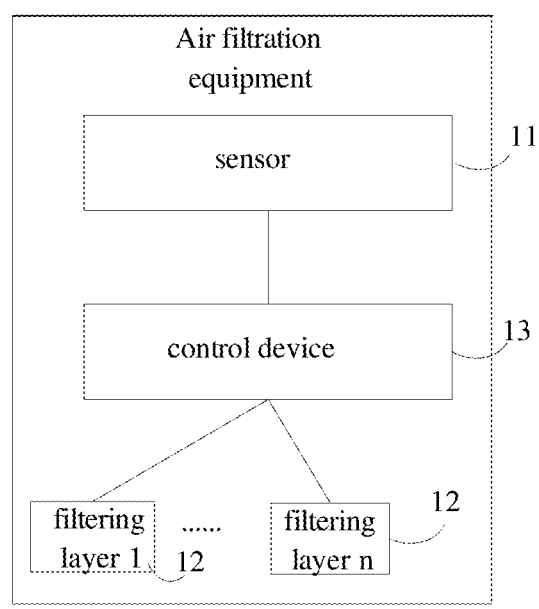
FIG. 1 is a structure diagram of an air filtration equipment provided in embodiments of the present disclosure.

REFERENCE NUMERALS sensor 11 filtering layer 12 control device 13 comparator 131 control component 132 fixed shaft 121 shifting shaft 122 fixing device 14 linkage element 1321 elastic telescopic structure 1322 driving control structure 1323 support 15

DETAILED DESCRIPTION

Thereafter will describe the solutions according to the embodiments of the present disclosure clearly and fully in connection with the drawings in the embodiments of the present disclosure. Obviously, the embodiments described are only a part of embodiments of the present disclosure instead of all of the embodiments. All of other embodiments educing from the embodiments of the present disclosure by those ordinary skilled in the art without any inventive labors are fallen into the scope of the present disclosure.

FIG. 1 shows a structure diagram of an air filtration equipment provided in embodiments of the present disclosure. As illustrated in FIG. 1, the air filtration equipment of the present embodiments may be installed in a ventilation area at an interface between indoor and outdoor spaces of a certain fixed space, such as a householder's window, a screen window; a car window, a screen window.

The air filtration equipment illustrated in FIG. 1 may include a sensor 11, a filtering layer 12 and a control device 13.

The sensor 11 in the present embodiments is configured to sense outside air quality, such as information on inhalable particles in the air. The information includes, for example, information on concentration of inhalable particles in the air and/or information on dimension/size of inhalable particles.

The air filtration equipment of the present embodiments may include one or more layers of filtering screens such as filtering layers 12. In general, three to five filtering layers 12 may be arranged according to practical requirements, each of which may be configured to filter out inhalable particles in the air entering indoor from the ventilation area.

The control device 13 is connected with the sensor 11 and all filtering layers 12 and controls each filtering layer 12 to expand according to information sensed by the sensor 11 such that the expanded filtering layer 12 covers the ventilation area.

As illustrated in FIG. 1, the control device 13 of the air filtration equipment is connected with a plurality of filtering layers. n for the filtering layers in FIG. 1 is a natural number greater than 1. There may be a plurality of filtering layers 12. Accordingly, it is also possible to provide one or more sensors 11. FIG. 1 shows only one sensor as an example. When there are pluralities of sensors in the air filtration equipment, each sensor is connected with the control device 13 that calculates an average according to the concentration information detected by each sensor and in turn controls each filtering layer 12 to expand or close.

It can be understood that the control device 13 in the present embodiments may control one or more filtering layer 12 to expand so as to cover the ventilation area according to information on inhalable particles in outdoor air sensed by the sensor 11.

In addition, in practical applications, the filtering layer 12 illustrated in FIG. 1 may be made of bionic compound nano-fibre material with filtration effect. For example, the bionic compound nano-fiber may include a spinning fiber layer and an active carbon fiber layer. The bionic compound nano-fiber may filter out atmosphere particles PM2.5 and smaller particles and can absorb normal volatile organic contaminants. In addition, bionic compound nano-fibers have very good air permeability. Therefore, it is possible to achieve good air filtration effect and not influence indoor and outdoor ventilation.

In addition, as a skilled person in the art known, the filtering layer 12 may also be of other structures with filtration effect.

For the air filtration equipment of the present embodiments, by installing the air filtration equipment in the ventilation area at the interface between indoor and outdoor spaces of each householder and sensing information on inhalable particles in outdoor air with a sensor in the air filtration equipment, the control device may control at least one filtering layer to expand and cover the ventilation area according to the information on inhalable particles sensed by the sensor, thereby addressing the problem of purifying polluted air indoors in prior art. The air filtration equipment filters air entering indoors in the air ventilation area to guarantee purification and circulation of indoor air.

Figure 2:
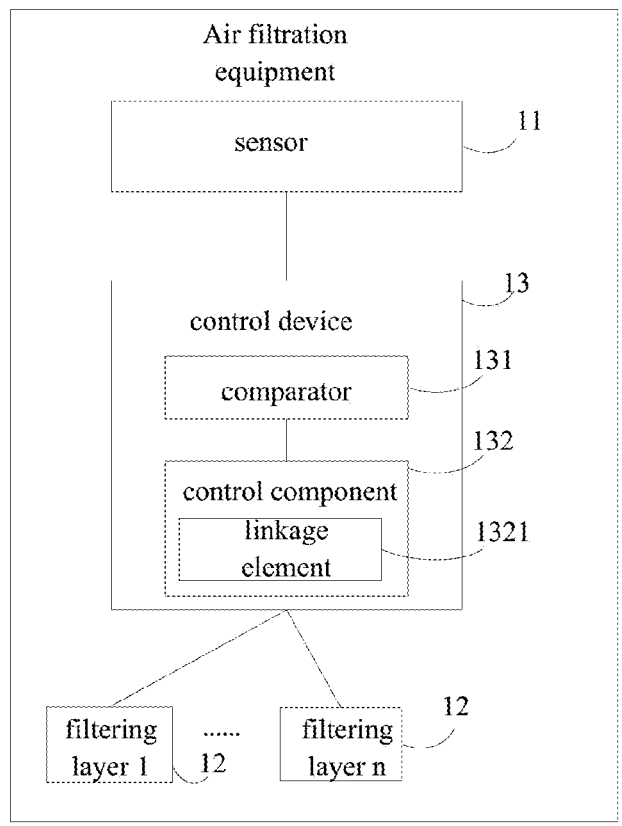
FIG. 2 is a structure diagram of an air filtration equipment provided in other embodiments of the present disclosure.

For example, the above-mentioned control device illustrated in FIG. 1 may include a comparator 131 and a control component 132 (as illustrated in FIG. 2) connected with the comparator 131. The control component 132 and the comparator 131 may be implemented by one or more microprocessor, for example. The comparator 131 is configured to compare the concentration information sensed by the sensor 11 with a first preset threshold and/or compare the particle size information with a second preset threshold. The control component 132 is configured to control the at least one filtering layer 12 to expand to cover the ventilation area when the concentration information is greater than the first preset threshold and/or the particle size information is greater than the second preset threshold.

It is to be understood that if the first preset threshold is a (a>0), and the comparator 131 determines that the concentration information sensed by the sensor 11 is greater than a, then the control component 132 may control one filtering layer 12 to expand and cover the ventilation area.

If the first preset threshold is b (b>a), and the comparator 131 determines that the concentration information sensed by the sensor 11 is greater than or equal to b, then the control component 132 may control two filtering layers 12 to expand and cover the ventilation area.

If the first preset threshold is c (c>b), and the comparator 131 determines the concentration information sensed by the sensor is greater than or equal to c, then the control component 132 may control three filtering layers 12 (or all filtering layers) to expand and cover the ventilation area; thereby realizing multiple purification for air entering indoors.

In practical applications, the control device 13 may further include a power supply module for powering the control component 132 and the comparator 131, such as a battery or a power supply interface. It is not described in the present embodiments and may be added according to practical requirements.

Figure 3A:
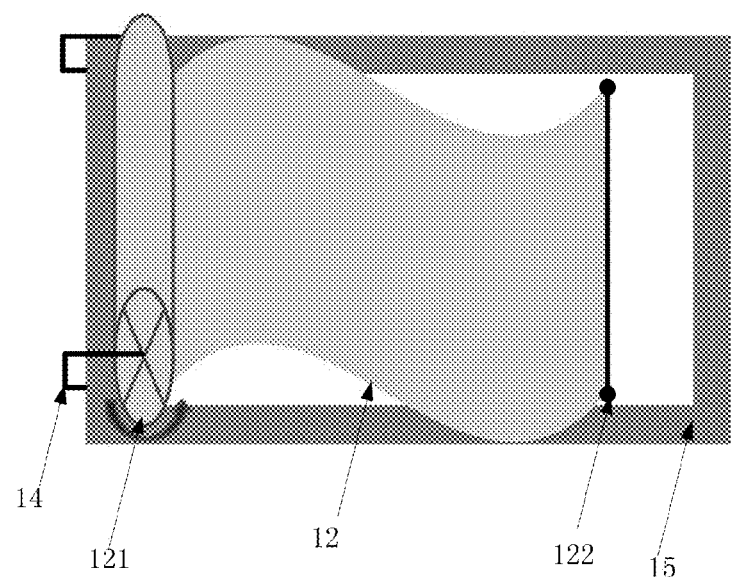
FIG. 3a is a partial structure diagram of an air filtration equipment provided in embodiments of the present disclosure.
Figure 3B:
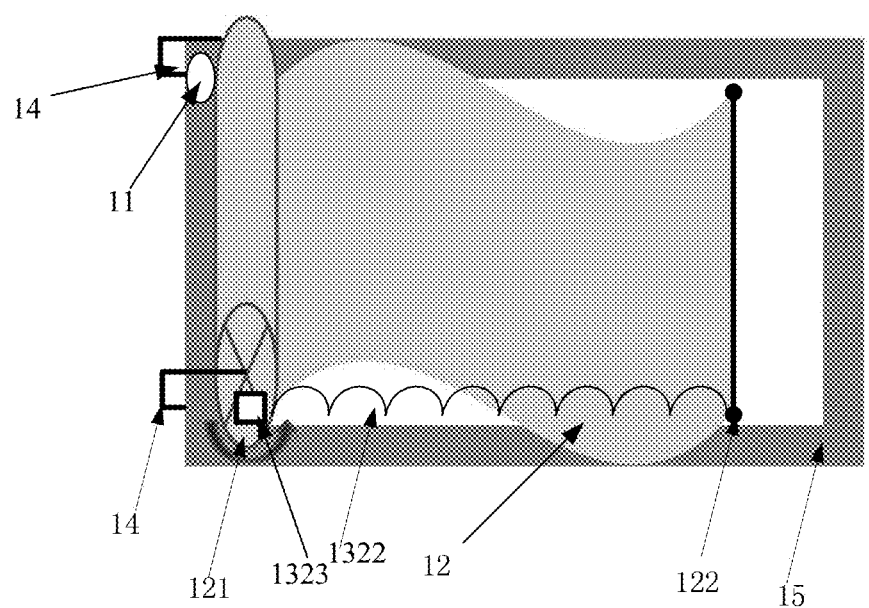
FIG. 3b is a partial structure diagram of an air filtration equipment provided in other embodiments of the present disclosure.

FIGS. 2, 3a and 3b show structure diagrams of the air filtration equipment provided in embodiments of the present disclosure respectively. With FIGS. 2, 3a and 3b, the structure of the control device for the air filtration equipment explained in detail in the present embodiments is as follows.

In embodiments, the sensor 11 is mainly configured to sense concentration information and/or particle size information of inhalable particles in the air.

Accordingly, the control device 13 may include a comparator 131 and a control component 132.

The comparator 131 is configured to compare the concentration information sensed by the sensor 11 with a first preset threshold and/or compare the particle size information with a second preset threshold.

The control component 132 is connected with the comparator 131 and configured to control the at least one filtering layer to expand and cover the ventilation area when the concentration information is greater than the first preset threshold and/or the particle size information is greater than the second preset threshold.

The above-mentioned control device 13, comparator 131 and control component 132 may be implemented at least partly by hardware, software, firmware or any combination thereof, for example.

The first preset threshold and the second preset threshold in the present embodiment are empirical values determined according to user's feelings and use experiences.

In this embodiment, each filtering layer 12 is provided with a fixed shaft 121 at the first end and provided with a shifting shaft 122 at the second end opposite to the first end. For example, as illustrated in FIG. 3, the filtering layer is of rectangular shape, then the first end of the filtering layer is one side of the rectangle, while the other side is the opposite side of the rectangle. In addition, one skilled in the art can understand that the filtering layer may also be of other shapes such as trapezoid, triangle and circle. Then, the above-mentioned first end and second end may be any two corresponding ends that can expand and retract the filtering layer.

As illustrated in FIG. 3, the air filtration equipment further includes a fixing device 14. The fixing device may be implemented by snap and screw for example. The fixing device 14 fixes the fixed shaft 121 on the support 15 in the ventilation area. Of course, it is also possible to fix it at other locations such as the lateral or vertical beams in the window. In addition, the fixing device 14 may also fix the sensor 11 on the support 15 or the lateral or vertical beams. In this way, the sensor may contact outside air sufficiently to detect outdoor air quality.

The aforementioned control component 132 includes: a linkage element 1321 connected with the fixing device 14, which drives a shifting shaft 122 of at least one filtering layer 12 to move to or away from the fixed shaft according to the concentration information and/or particle size information. For example, when the shifting shaft 122 moves away from the fixed shaft 121, the filtering layer 12 equipped with the shifting shaft 122 expands; and when the shifting shaft 122 moves to the fixing shaft 121, the filtering layer 12 equipped with the shifting shaft 122 contracts, for example, contracting or folding up around the fixed shaft 121.

Referring to FIG. 3b, for example, in one possible implementation, the above-mentioned linkage element 1321 includes: an elastic telescopic structure 1322 and a driving control structure 1323, in which the elastic telescopic structure 1322 is located between and connect the fixed shaft 121 and the shifting shaft 122 of each filtering layer 12. The elastic telescopic structure 1322 may be, for example a spring, a telescopic link etc.

The driving control structure 1323 is connected with each elastic telescopic structure 1322 to drive it expand and contract, so as to drive the shifting shaft 122 to move to or away from the fixed shaft 121. The driving control structure 1323 may be, for example, a mechanical force driving control structure or a magnetic force or electrical force driving control structure, such as a buckle-slot structure, a linkage, a magnetic iron or an electromagnet. For example, the driving control structure 1323 may include a microprocessor and a motor, and transmit signals to the microprocessor when the comparator 131 determines that the pollutant concentration in outdoor air is greater than a threshold. The microprocessor further transmits a control signal to the motor that controls the driving control structure 1323 to produce a driving force according to the control signal so as to drive the elastic telescopic structure 1322 to protrude or retract, thereby driving the shifting shaft to move and controlling expansion or contraction of the filtering layers.

In the present embodiments, each elastic telescopic structure 1322 may be connected with a driving control structure 1323, or all elastic telescopic structures 1322 are connected with a driving control structure 1323, which may be configured according to practical requirement.

In other embodiments, the above-mentioned linkage element 1321 may further include other structures that can move shifting shaft 122 of each filtering layer and the above-mentioned elastic telescopic structure and driving control structure are not limited. For example, the linkage element 1321 may include a sliding track and a corresponding driving control structure. Two ends of the shifting shaft 122 are located in corresponding sliding tracks respectively. The driving control structure controls the sliding of shifting shaft 122 in the sliding track according to the comparator's comparison result/result information to allow it to move to or away from the fixed shaft 121.

It is to be noted that the support 15 described in FIG. 2 may be a screen window support or a window support.

The present embodiments illustrate a structure of a control device. The above-mentioned control component illustrated in FIG. 2 may be an example. In other embodiments or implementations, it is not limited to the structure illustrated in FIG. 2 and the components included in the control device may be adjusted according to practical requirements.

Of course, any control component that can control expansion or curling retraction according to the comparator's determination result information falls within the scope of the embodiments of the present disclosure.

The linkage element of the control component in the present embodiments can drive the shifting shaft of a filtering layer to move to or away from the fixed shaft according to the result information of the comparator's determination. It is further achieved that the filtering layer(s) cover the ventilation area when the concentration information is large, which addresses the problem that polluted air must enter indoors for purification and guarantees purification and circulation of indoor air.

In the present embodiments, a sensor 11 for sensing concentration information and particle size information of inhalable particles in the air may be mounted on the support such as screen window support or window support and/or a linkage element 1321 for controlling movement of the shifting shaft 122 of the filtering layer 12 may be mounted on the support. Further, when outdoor environment changes, for example, air is polluted, the linkage element drives the shifting shaft on the filtering layer to move away from the fixed shaft of the filtering layer and in turn cover the ventilation area, thereby guaranteeing air entering indoors is purified air and in turn improving the indoor air environment.

On the other hand, embodiments of the present disclosure further provide a screen window including a screen window support and any of the above-mentioned air filtration equipment mounted on the screen window support. Refer to the above-mentioned embodiments for specific structure and functions of the air filtration equipment, which will not be described any more herein.

The screen window in the present embodiments may be a smart screen window. Generally, the air filtration equipment is mounted on the support of the smart screen window and located on the indoor side of the screen window body. Of course, in other implementations, the air filtration equipment may also be mounted on the support of the smart screen window and located on the outdoor side of the screen window body.

With the present embodiments, by adding a sensor that can sense information on inhalable particles in the air on the screen window, when the outside air changes, the sensor senses information on the inhalable particles in the air, and in turn the control component can determine whether to decrease or increase filtering layers in the screen window according to the information sensed by the sensor, to adapt to different weather environment and guarantee circulation of indoor air. Furthermore, the number of filtering layers may be increased in case of very bad environmental quality. As compared to the air purifier in prior art, for the embodiments of the present disclosure, it is not required that the polluted air should enter a room, but that air having not entered the room may be purified, which drastically improves the indoor air environment and quality of life.

For example, after getting up in the morning, the user can open the window directly to breath fresh air outdoors, which avoid the problem of prior art that the user can not open the window directly due to air pollution. In addition, the screen window mentioned in embodiments may be a smart screen window that can automatically detect size and concentration of particles in outside air to determine the outside air quality. The control device may control expansion or closure of filtering layers according to user's presetting. For example, the sensor detects the concentration information of PM2.5 particles, and when the concentration is less than a (a>0), no filtering layer is expanded and outdoor fresh air may enter indoors directly. When the concentration is greater than or equal to a and less than b (b>a), one filtering layer is opened and outdoor air enters indoors after being purified by the filtering layer of the screen window. When the concentration is greater than or equal to b and less than or equal to c (c>b), one more filtering layer may be opened (that is, two filtering layers cover the ventilation area), and the outdoor air enters indoors after double purifications. And so on, the number of filtering layers in the ventilation area may be increased gradually according to the concentration change of PM2.5 particles and air entering indoors is purified for multiple times, thereby guaranteeing cleanness of indoor air and improve quality of life.

Other embodiments of the present disclosure further provide a window including a window support and the above-mentioned air filtration equipment that may be mounted on the window support. Refer to the above-mentioned embodiments for specific structure and functions of the air filtration equipment, which will not be described any more herein.

In specific applications, the window support is further provided with sashes that may be opened by rotation. An installation mode of the above-mentioned air filtration equipment may be as follows: when the sashes are opened outdoors by rotation, the air filtration equipment may be mounted on the window support and located on the indoor side of the sashes.

Other installation mode of the above-mentioned air filtration equipment may be as follows: when the sashes are opened indoors by rotation, the air filtration equipment may be mounted on the window support and located on the outdoor side of the sashes.

With the present embodiments, by adding an air filtration equipment on the window, when outdoor air is polluted, at least one filtering layer may be expanded to allow polluted air to enter the room after being purified by the filtering layer, thereby guaranteeing circulation of indoor air, addressing the defect of prior art of incapability of guaranteeing air entering the room is purified air, and in turn drastically improving indoor air environment and quality of life.

In summary, for the air filtration equipment, the screen window and window of the embodiments of the present disclosure, by installing the air filtration equipment in the ventilation area at the interface between indoor and outdoor spaces of each householder and sensing information on inhalable particles in outdoor air with a sensor in the air filtration equipment, the control device may control at least one filtering layer to expand and cover the ventilation area according to the information on inhalable particles sensed by the sensor, thereby addressing the problem of purifying polluted air indoors in prior art. The air filtration equipment filters air entering indoors in the air ventilation area to guarantee purification and circulation of indoor air.

Those skilled in the art can make various modifications and variations to the present disclosure without departing from the spirit and scope thereof. Thus, if these modifications and variations of the present disclosure are within the scope of the claims of the invention as well as their equivalents, the present disclosure is also intended to include these modifications and variations.

The present application claims priority of China Patent application No. 201510460024. X filed on Jul. 30, 2015, the content of which is incorporated in its entirety as part of the present application by reference herein.

What is claimed is:

1. An air filtration equipment that may be installed in an ventilation area at an interface between indoor and outdoor spaces of a fixed space, the equipment comprising:
    a sensor configured to sense information on inhalable particles in outside air;
    at least one filtering layer configured to filter out inhalable particles in air entering from the ventilation area into the indoor space; and
    a control device connected with the sensor and the at least one filtering layer and configured to control the at least one filtering layer to expand according to the information sensed by the sensor, such that the expanded at least one filtering layer covers the ventilation area;
    wherein the sensor is fixed on a support or beams of a window to detect outdoor air quality.

2. The equipment of claim 1, wherein the filtering layer is of bionic compound nano-fiber with filtration function.

3. The equipment of claim 2, wherein the bionic compound nano-fiber may comprises a spinning fiber layer and an active carbon fiber layer.

4. The equipment of claim 1, wherein the sensor is configured to sense concentration information and/or particle size information of inhalable particles in the air;
    the control device comprises:
    a comparator configured to compare the concentration information sensed by the sensor with a first preset threshold and/or compare the particle size information with a second preset threshold;
    a control component connected with the comparator and configured to control the at least one filtering layer to expand and cover the ventilation area when the concentration information is greater than the first preset threshold and/or the particle size information is greater than the second preset threshold.

5. The equipment of claim 1, wherein each of the filtering layers is provided with a fixed shaft at a first end and a shifting shaft at a second end opposite to the first end, and the air filtration equipment further comprises a fixing device configured to fix the fixed shaft.

6. The equipment of claim 5, wherein the fixing device fixes the fixed shaft on a support at edges of the ventilation area.

7. The equipment of claim 5, wherein the fixing device is further configured to fix the sensor on a support at edges of the ventilation area.

8. The equipment of claim 5, wherein the control component comprises: a linkage element connected with the fixing device, the linkage element driving the shifting shaft of the at least one filtering layer to move to or away from the fixed shaft according to the concentration information and/or the particle size information;
    when the shifting shaft moves away from the fixed shaft, the filtering layer expands; and
    when the shifting shaft moves to the fixed shaft, the filtering layer contracts.

9. The equipment of claim 8, wherein the linkage element comprises:
    an elastic telescopic structure between the fixed shaft and the shifting shaft of each filtering layer connecting the fixed shaft and the shifting shaft; and
    a driving control structure connected with each elastic telescopic structure and configured to drive the elastic telescopic structure to expand and contract, so as to drive the shifting shaft to move to or away from the fixed shaft.

10. The equipment of claim 5, wherein the support is a screen window support or a window support.

11. The equipment of claim 1, wherein a number of the filtering layers is two or more.

12. A screen window comprising a screen window support and an air filtration equipment installed on the screen window support;

the air filtration equipment capable of being installed in an ventilation area at an interface between indoor and outdoor spaces of a fixed space, the equipment comprising:
a sensor configured to sense information on inhalable particles in outside air;
at least one filtering layer configured to filter out inhalable particles in air entering from the ventilation area into the indoor space; and
a control device connected with the sensor and the at least one filtering layer and configured to control the at least one filtering layer to expand according to the information sensed by the sensor, such that the expanded at least one filtering layer covers the ventilation area;
wherein the sensor is fixed on the support or beams of the window to detect outdoor air quality.

13. The screen window of claim 12, wherein the sensor is configured to sense concentration information and/or particle size information of inhalable particles in the air;
the control device comprises:
a comparator configured to compare the concentration information sensed by the sensor with a first preset threshold and/or compare the particle size information with a second preset threshold; and
a control component connected with the comparator and configured to control the at least one filtering layer to expand and cover the ventilation area when the concentration information is greater than the first preset threshold and/or the particle size information is greater than the second preset threshold.

14. The equipment of claim 12, wherein each of the filtering layers is provided with a fixed shaft at a first end and a shifting shaft at a second end opposite to the first end, and the air filtration equipment further comprises a fixing device configured to fix the fixed shaft.

15. The equipment of claim 14, wherein the fixing device fixes the fixed shaft on a support at edges of the ventilation area.

16. The equipment of claim 13, wherein the control component comprises: a linkage element connected with the fixing device, the linkage element driving the shifting shaft of the at least one filtering layer to move to or away from the fixed shaft according to the concentration information and/or the particle size information;
when the shifting shaft moves away from the fixed shaft, the filtering layer expands; and
when the shifting shaft moves to the fixed shaft, the filtering layer contracts.

17. The equipment of claim 16, wherein the linkage element comprises:

an elastic telescopic structure between the fixed shaft and the shifting shaft of each filtering layer connecting the fixed shaft and the shifting shaft of the filtering layer; and
a driving control structure connected with each elastic telescopic structure and configured to drive the elastic telescopic structure to expand and contract, so as to drive the shifting shaft to move to or away from the fixed shaft.

18. A window comprising a window support and an air filtration equipment installed on the window support;
the air filtration equipment capable of being installed in an ventilation area at an interface between indoor and outdoor spaces of a fixed space, the equipment comprising:
a sensor configured to sense information on inhalable particles in outside air;
at least one filtering layer configured to filter out inhalable particles in air entering from the ventilation area into the indoor space; and
a control device connected with the sensor and the at least one filtering layer and configured to control the at least one filtering layer to expand according to the information sensed by the sensor, such that the expanded at least one filtering layer covers the ventilation area;
wherein the sensor is fixed on the support or beams of the window to detect outdoor air quality.

19. The screen window of claim 18, wherein the sensor is configured to sense concentration information and/or particle size information of inhalable particles in the air;
the control device comprises:
a comparator configured to compare the concentration information sensed by the sensor with a first preset threshold and/or compare the particle size information with a second preset threshold; and
a control component connected with the comparator and configured to control the at least one filtering layer to expand and cover the ventilation area when the concentration information is greater than the first preset threshold and/or the particle size information is greater than the second preset threshold.

20. The equipment of claim 19, wherein the control component comprises: a linkage element connected with the fixing device, the linkage element driving the shifting shaft of the at least one filtering layer to move to or away from the fixed shaft according to the concentration information and/or the particle size information;
when the shifting shaft moves away from the fixed shaft, the filtering layer expands; and when the shifting shaft moves to the fixed shaft, the filtering layer contracts.

\* \* \* \* \*